(12) United States Patent
Ma (10) Patent No.: US 7,756,972 B2
(45) Date of Patent: Jul. 13, 2010

(54) SYSTEM FOR POWER SAVINGS IN SERVER FARMS

(75) Inventor: Kevin Ma, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 790 days.

(21) Appl. No.: 11/295,413

(22) Filed: Dec. 6, 2005

(65) Prior Publication Data

US 2007/0130341 A1 Jun. 7, 2007

(51) Int. Cl.
*G06F 15/173* (2006.01)
*G06F 16/16* (2006.01)

(52) U.S. Cl. .................. 709/224; 709/226; 709/229
(58) Field of Classification Search ........... 709/224, 709/226, 229
See application file for complete search history.

(56) References Cited

U.S. PATENT DOCUMENTS

| | | | |
|---|---|---|---|
| 6,189,108 B1* | 2/2001 | Cromer et al. | 713/340 |
| 6,892,312 B1 | 5/2005 | Johnson | |
| 2002/0062454 A1* | 5/2002 | Fung | 713/300 |
| 2004/0047354 A1 | 3/2004 | Slater et al. | |
| 2006/0129687 A1* | 6/2006 | Goldszmidt et al. | 709/229 |
| 2006/0136761 A1* | 6/2006 | Frasier et al. | 713/320 |
| 2006/0161765 A1* | 7/2006 | Cromer et al. | 713/2 |
| 2006/0185015 A1* | 8/2006 | Cheston et al. | 726/24 |
| 2006/0206730 A1* | 9/2006 | Cartes et al. | 713/300 |
| 2007/0050644 A1* | 3/2007 | Merkin | 713/300 |

OTHER PUBLICATIONS

Heung Ki Lee, et al, "Application-Level Memory Management in Cluster-based Servers" 1 page, Department of Computer Science, Texas A&M University, College Station, TX.
Jeffery S, Chase, et al, "Balance of Power: Energy Management for Server Clusters" 6 pages, Department of Computer Science, Duke University.
E.J. Kim, et al, "Energy Optimization Techniques in Cluster Interconnects", Copyright 2003, 6 pages, Department of Computer Science and Engineering, Pennsylvania State University, University Park, PA 16802.
Karthick Rajamani, et al, "On Evaluating Request-Distribution Schemes for Saving Energy in Server Clusters", 12 pages, IBM Austin Research Lab.

(Continued)

*Primary Examiner*—John Follansbee
*Assistant Examiner*—Alan S Chou
(74) *Attorney, Agent, or Firm*—Trellis IP Law Group, PC (57) ABSTRACT

A threshold-based approach is used to assign tasks to servers in a server farm. A "number of connections" count or "connection rate" is maintained for an active server and when the count achieves a first value a wake up signal is sent to a next (inactive) server to alert the inactive server to become active and periodic keep alive signals are initiated. When the number of connections next reaches a second, higher value, subsequent requests for connections are sent to the newly active server. Variations of this approach allow for servers and their associated processes and devices to be handled in clusters for power management scaling efficiency. Servers can be placed in the inactive mode when the number of connections reaches a lower threshold. Other criteria can be used to determine activation of servers, processors or other devices or processes. Other types of resource use monitoring can also be used with this invention.

21 Claims, 4 Drawing Sheets

OTHER PUBLICATIONS

Heung Ki Lee, et al, "On Improving Performance and Conserving Power in Cluster-based Web Servers", 2 pages, Texas A&M University.

Eduardo Pinheiro, et al, "Load Balancing and Unbalancing for Power and Performance in Cluster-Based Systems" 8 pages, Department of Computer Science, Rutgers University, Piscataway, NJ 08854-8019.

Yuho Jin, et al, "Peak Power Control for a QoS Capable On-Clip Networks" 1 page, High Performance Computing Laboratory, Department of Computer Science, Texas A&M University.

"Operating Systems and Architectural Techniques for Power and Energy Conservation", 3 pages, Department of Computer Science Rutgers University.

"Enhanced Intel SpeedStep Technology How to Document" 3 pages.

"Wake on LAN mini How to: Wake on LAN", 3 pages.

"ImageCast and Wired for Management (WfM) Standard" 4 pages, StorageSoft.

"Preboot Execution Boot ROM Code, Remote system setup and configuration capability for networked PCs", 2 pages, AMD.

"Network Alarm Clock featuring Magic Packet Technology, Remote power-on management for networked PCs", 3 pages, AMD.

"Command Reference, vol. 6, v-z-wol command", 2 pages.

"AMD Opteron Board, Socket 939 (AMD Opteron 100s series", 3 pages.

* cited by examiner

SYSTEM FOR POWER SAVINGS IN SERVER FARMS

BACKGROUND OF THE INVENTION

This invention relates in general to power consumption in digital processing systems and more specifically to power savings in server farms.

It is desirable to minimize power consumption in electronic devices such as digital processing systems. Reducing power consumption not only reduces the cost of operation but can have other benefits such as preserving or extending the operating lifetime of electronic devices. One particular type of system that can benefit from power savings includes large collections of similar devices such as server "farms." Server farms can include tens, hundreds, thousands or more separate computer systems, or servers. The servers are usually interconnected by a common network and are provided with centralized control or management. Server farms are often used in large enterprise processing applications to act as database front-ends, web page servers, application service providers, etc.

Although large numbers of servers are often necessary to handle the demands of enterprise applications, operating so many servers has drawbacks. Power consumption can be costly and the increased heat in roomfuls of servers can cause electronic and mechanical components to degrade more quickly and thus fail sooner. Other effects of can include structural fatigue from vibration, lower levels of operating voltage or "brownout" conditions if the power supply is not sufficient; increased requirements for power infrastructure, cooling and maintenance, etc.

In order to reduce the above drawbacks some power-saving approaches have been adopted. For example, microprocessor vendors have made great in power management technologies for central processing units (CPUs). Attempts at server load distribution or balancing have included looking at the effects of temporal locality as well as performing strategic server shutdown. In many environments, where network-based server load balancers are typically employed, there is an inherent knowledge of load distribution in the server farm. The CPU can tell when it has had no load for a while, and can place itself in a low power state.

Typically, a load balancing scheme is designed to maintain "connection efficiency" of a server farm. That is, it is desirable to respond to a server request as quickly as possible. This reduces, for example, the amount of time a user might have to wait before a web page can is fully displayed on the user's computer screen. Load-balancing schemes for assignment of a next request to a server in a server farm can include "round robin," "weighted round robin," "least connections" and "content specific" based decisions. These approaches have drawbacks. For example, in a strict round robin approach many, or all, servers will get a request for processing at regular intervals even when the overall load on the server farm is very light.

DETAILED DESCRIPTION OF EMBODIMENTS OF THE INVENTION

In a preferred embodiment, a threshold-based approach is used to assign tasks to servers in a server farm. Servers are categorized as in two basic states: "active" or "standby." The active state is one where the server is at a high level, or full level, of power consumption or operating ability. Typically, an active server is already processing one or more tasks and is ready to immediately accept another task. The standby state is a lower-power consuming state than the active state. The standby state can include some of the server's subsystems in low power (e.g., "idle"), or powered-down modes. For example, the server's disk can be parked or spun down. The server's processor or motherboard might have some components or subsystems at low power or powered-off.

When new tasks come in for handling by the server farm the new task is assigned to an active server in an active server "pool," or group, unless the assignment of the new task to the active server (or server group, as explained below) would cause the active server or group to be above a threshold utilization. If the threshold would be exceeded then the new task is assigned, instead, to a newly active server taken from the standby pool. Various refinements to this approach are described in more detail below, such as arranging the types of servers into one or more groups or clusters, making a server active in advance of an anticipated new task request or other resource use that would need to be assigned to a standby server, providing for standard maintenance aspects of server farms such as allowing standby servers to respond to "keep alive" signals, etc.

In one embodiment, tasks such as connection requests to servers are handled in batches. For example, if there are 3 servers A, B and C and each has a threshold of 50 connections per second then server A can be active and servers B and C can be standby. If 3 connection requests come in at the same, or approximately the same, time they will all be assigned to server A, thus leaving B and C in the low-power standby state.

Naturally, if the three requests each went to a different active server the average response time would likely be faster than having one server handle all 3 connections at about the same time but the connection threshold is set according to a tradeoff between service and power savings. In an application where the servers are providing web pages to human users a delay of tens of milliseconds is not noticeable or objectionable to the users and can provide enough time for a server to handle several or many page services. The threshold value can be set according to many factors or tradeoffs such as page size, server speed, user expectations, communication link bandwidth, quality of service guarantees or goals, etc.

When the rate of new connection requests plus the current connection rate handled by server A approaches the batch threshold limit then server B is brought into an active state and is added to the group of active servers. In a preferred embodiment server B's power-up starts in anticipation of the time that server B will actually be needed. A signal is sent in advance to server B to start the power-up process. Load balancing between or among active servers can include any traditional means as is known in the art. In a preferred embodiment, the load balancer sends the power-up signal (e.g., WOL frame) but in other embodiments separate servers or other devices can be used to send power-up signals and to perform load balancing.

Note that the batch approach provides different power performance than other approaches. For example, in a round-robin approach each connection is assigned sequentially to a different server so that all 3 servers might be activated within a short period of time. If no further connections arrive soon after the initial 3 then powering up all three within a short period of time is not efficient. In a "least number of connections" approach if the connections come in at almost the same time (i.e., too fast for one server to complete a connection request before the next request arrives) then each connection would also be assigned to a different server.

Figure 1:
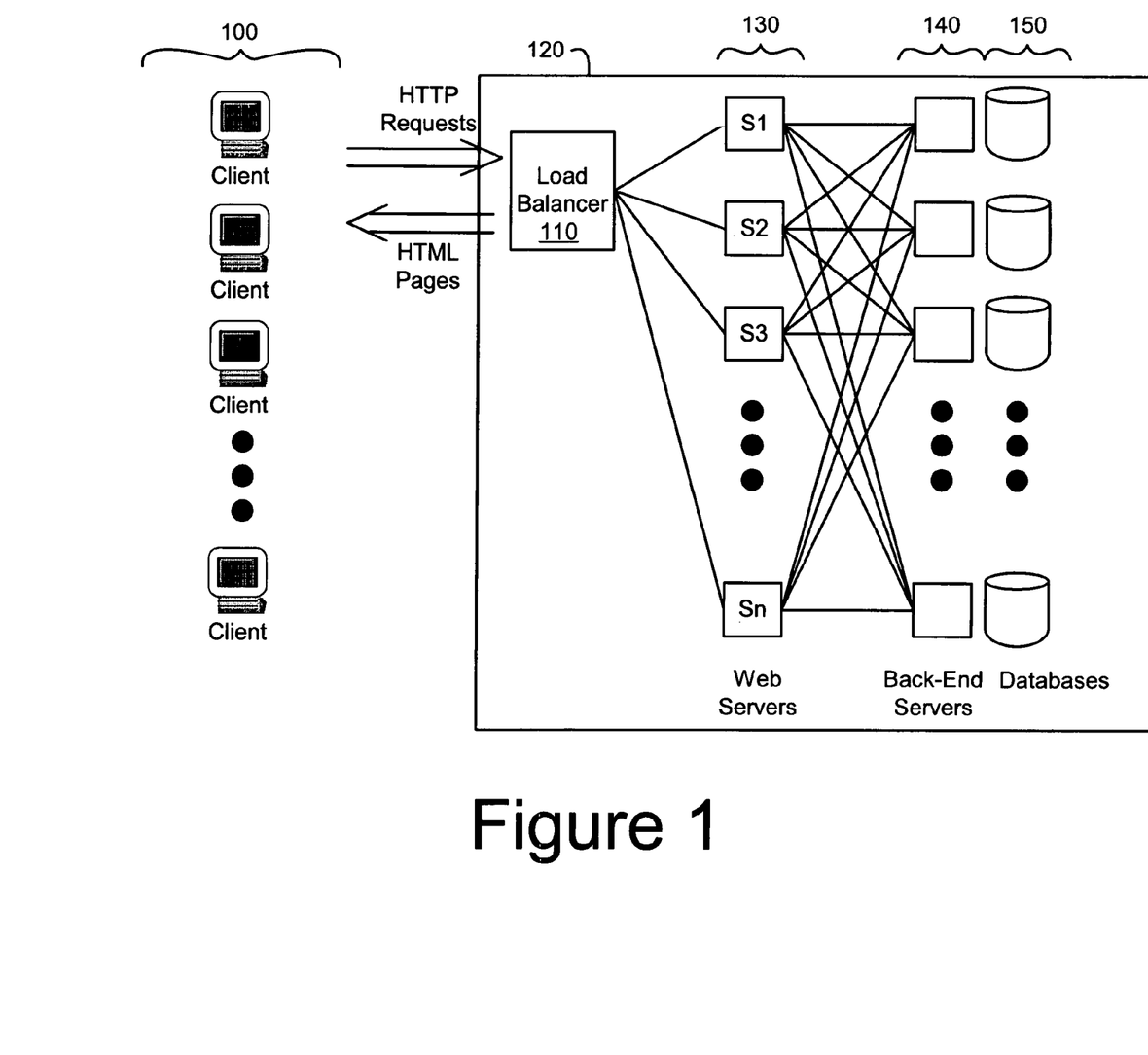
FIG. 1 shows a diagram of a server farm application suitable for use with the present invention.

FIG. 1 shows a diagram of a server farm application suitable for use with the present invention. Client computers 100 operated by users make Hyper Text Transfer Protocol (HTTP) requests of load balancer 110. Load balancer 110 is a server computer or dedicated device that acts as a front end for server farm 120 to distribute the HTTP requests to web servers 130, and to provide web pages in, for example, a Hyper Text Markup Language (HTML) format.

Web servers 130 can be active or standby. Note that although a preferred embodiment of the invention is primarily described with respect to these two modes of power operation, other approaches can use more than two modes. For example, a multi-tiered power approach can use 3 or more groups, or pools, of servers in different states of activity and power status. Devices can be in "hibernation" mode where the disks are spun down, random access memory (RAM) is copied to a hard drive and the RAM is shut off, the devices are completely powered-off, etc.

Web servers 130 communicate with back-end servers 140 to access database information from databases 150, perform processing necessary for dynamic web pages, derive content, perform calculations, accomplish financial transactions, etc. Many other arrangements of server farms are possible. Any number of devices and layers of devices can be used rather than the specific arrangement shown in FIG. 1.

In a preferred embodiment, the power control and management functions are performed by a processor within load balancer 110. These functions can be implemented in hardware, software or a combination of both. Typically load balancer 110 is already provided with the ability to control web servers 130. However, any processes, devices or protocols can be used to supply portions of the functionality and control described herein.

For a power management scheme using batch connection thresholds, a threshold for each server is established. The threshold can be the same among the servers or different servers can use different thresholds. For example, assume a connection threshold of 50 connections per second is used for each server. This means that for every rate increase of 50 connections per second another server will be made active from a standby state.

Figure 2:
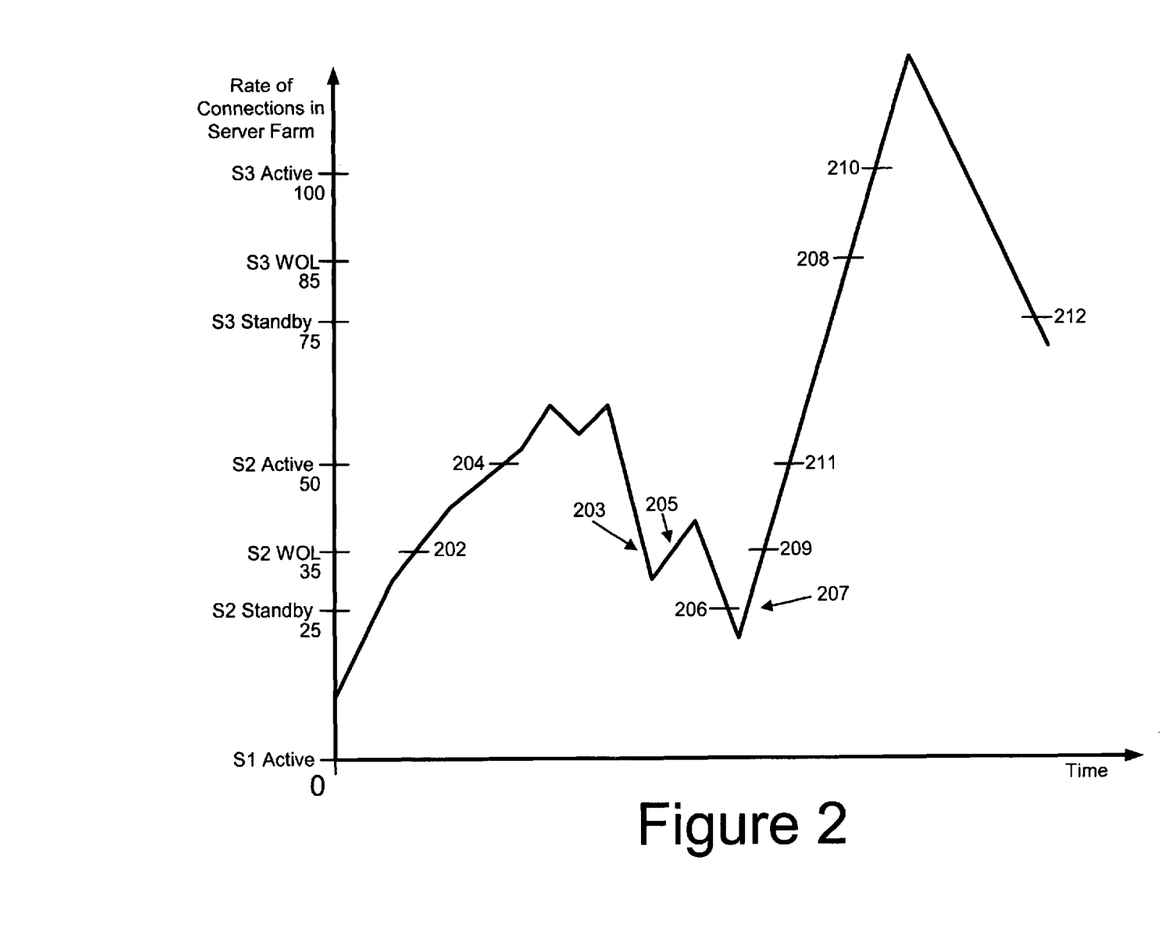
FIG. 2 shows a graph that illustrates details of moving a server from a standby state to an active state.

FIG. 2 shows a graph that illustrates details of moving a server from a standby state to an active state. In FIG. 2, the vertical axis indicates the number of current connections per second for the server farm while the horizontal axis shows time increasing to the right. Thus, the graph shows the change in current rate of connections with respect to time. At time 0 it is assumed that there are 10 connections per second and the rate of connections is increasing. Server S1 is always maintained in an active state to handle a rate from 0 to 49. Servers other than server S1 are initially in a standby mode. When the rate reaches 35 at point 202 then a Wake On LAN (WOL) signal is sent and periodic "keep alive" (KAL) signals are commenced and sent at regular intervals to server S2 to cause server S2 to begin to transition from the standby state to the active state. The difference in connection rate between generating a WOL signal and generating an active state signal is 15 in order to give a newly activated server enough time to reach the active state before it is expected to be able to handle connections. In other designs this difference can vary.

At point 204 server S2 is expected to be in the active state added to the pool of active servers and can be provided with a connection request. Should the rate of connections fall to 25 as shown at point 206 then server S2 is placed into standby mode and KAL signals can also be stopped if the server is placed in a power-state that does not support KAL responses. The standby number is set at less than the active number (in this case 25 connections per second less) and is also set lower than the WOL number so that hysteresis is built in to prevent rapid state changing or "power flogging" of the servers. Note that in a preferred embodiment a WOL signal is not sent if it is known that the server is active. For example, at 203 and 205 the S2 WOL threshold is achieved but it is known that the S2 server had already been placed into an active state and remains there so no WOL signal is sent. However, other designs can send WOL signals regardless such as whenever the WOL rate of connections is achieved (either increasing or decreasing in total number or whether the server is thought to be active or not).

At 206, server S2 is placed in standby. At 209 server S2 is again provided with a WOL signal and is provided with a next connection request at 211.

The approach for changing state for server S2 is similarly applied to other servers in the farm as shown by the same type of threshold values for server S3 on the graph. At 208 a WOL signal is sent to server S3, at 210 a next connection request is provided to server S3 and at 212 server S3 is placed back in a standby mode. Threshold values can be used for all servers in the server farm, or pool, up until all the servers are included in the active group. Additional benefits can be attained by using addition/removal rules that take into account other factors. For example, an adaptive algorithm for moving the thresholds based on the time calculated between group transitions can be used. The threshold values can be dynamically changed depending on known cyclical loads (e.g., daily or nightly peaks, etc.), maintenance or changes to the pool, server operating performance, etc.

By measuring actual operating characteristics optimal active, WOL and standby threshold values can be determined. For example, frequency of server standby timeouts, time to transition from standby to active, or other operating characteristics can be measured. Additionally, integrating support for protocols like SASP, for server management, into this scheme allows for optimization of the server side thresholds. However, proprietary protocols, like SASP, are not necessarily required.

Figure 3:
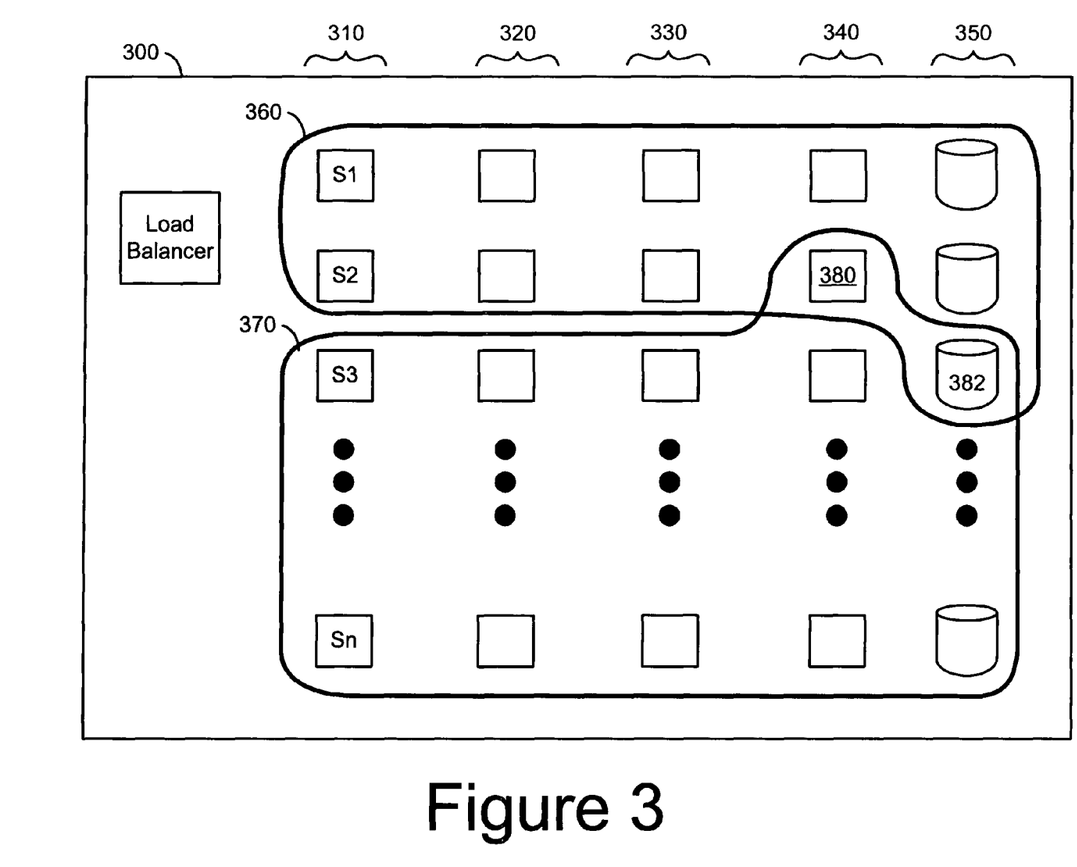
FIG. 3 illustrates a further embodiment of the invention where power management is applied to clusters of servers and associated devices.

FIG. 3 illustrates a further embodiment of the invention where power management is applied to clusters of servers and associated devices.

In FIG. 3, server farm 300 includes more levels of servers or other devices than are shown in FIG. 1. For example, servers at level 310 can be web servers, level 320 can include ecommerce devices and processes such as servers to handle product selection (e.g., shopping carts) and transactions. Level 330 can include content management and levels 340 and 350 can include database servers and physical databases, respectively. In general, any number and type of levels, or even a different architecture, is possible. Also, although the invention is discussed primarily with respect to servers, any other types of devices or processes can be used with features of the present invention.

The devices of FIG. 3 are grouped into two clusters, 360 and 370, as shown by the groupings in bold lines. Note that some devices or processes (i.e., "items") such as 380 and 382 can belong to more than one cluster. In general, any arrangement of two or more groupings of items can be a cluster. All items in a farm or location do not need to belong to clusters. Also, clusters can be logical or virtual and can include items that are widely separated geographically, and items that exist devoid of physical boundaries (e.g., virtual disk storage, distributed processes, etc.). The interconnections or groupings among and between items in clusters can use any type of communication link (e.g., hardwired, fiber optic, wireless, etc.) and can be of any topology and organization.

Once clusters are defined the power management approach using thresholds for performance criteria can be applied to them similar to the above discussion of individual servers in connection with the discussion of FIGS. 1 and 2, above.

Other advantages can be realized. For example, if it is known that certain databases are only used by certain associated servers, then when the servers are placed in a standby mode the databases and any other associated equipment might also be placed in a lower-power (e.g., "standby") mode. A power management hierarchy can be established by using the clusters. Different weights and thresholds can be applied at each level, and different load balancing algorithms can be used for different clusters. For example, when a product list is being updated automatically at set intervals then it may be desirable to keep the database levels active, or to keep a cluster that handles database updates active with a very low, or no, threshold for sending a standby signal during the updating.

Consideration can also be given to health monitoring mechanisms for servers in the lower power state. Keep alives (KALs) can be employed to maintain quality of service and reliability. KALs, however, cause load on servers. By waiting until the WOL threshold before intiating KALs, load power efficiency is optimized. An adaptive approach, to bring new servers on line, in advance of threshold overflow, can be used to ensure full availability.

Note that other methods of conserving power can be used rather than placing devices in standby or in an "idle" state. For example, chip and computer manufacturers offer options for placing their devices in various levels of power consumption with corresponding performance decreases. Intel™ includes SpeedStep™ technology for controlling central processing unit (CPU) power consumption. AMD™ includes Power-Now!™ technology for controlling central processing unit (CPU) power consumption. Any of these provided options can be used with features of the present invention to assist in power management.

Figure 4:
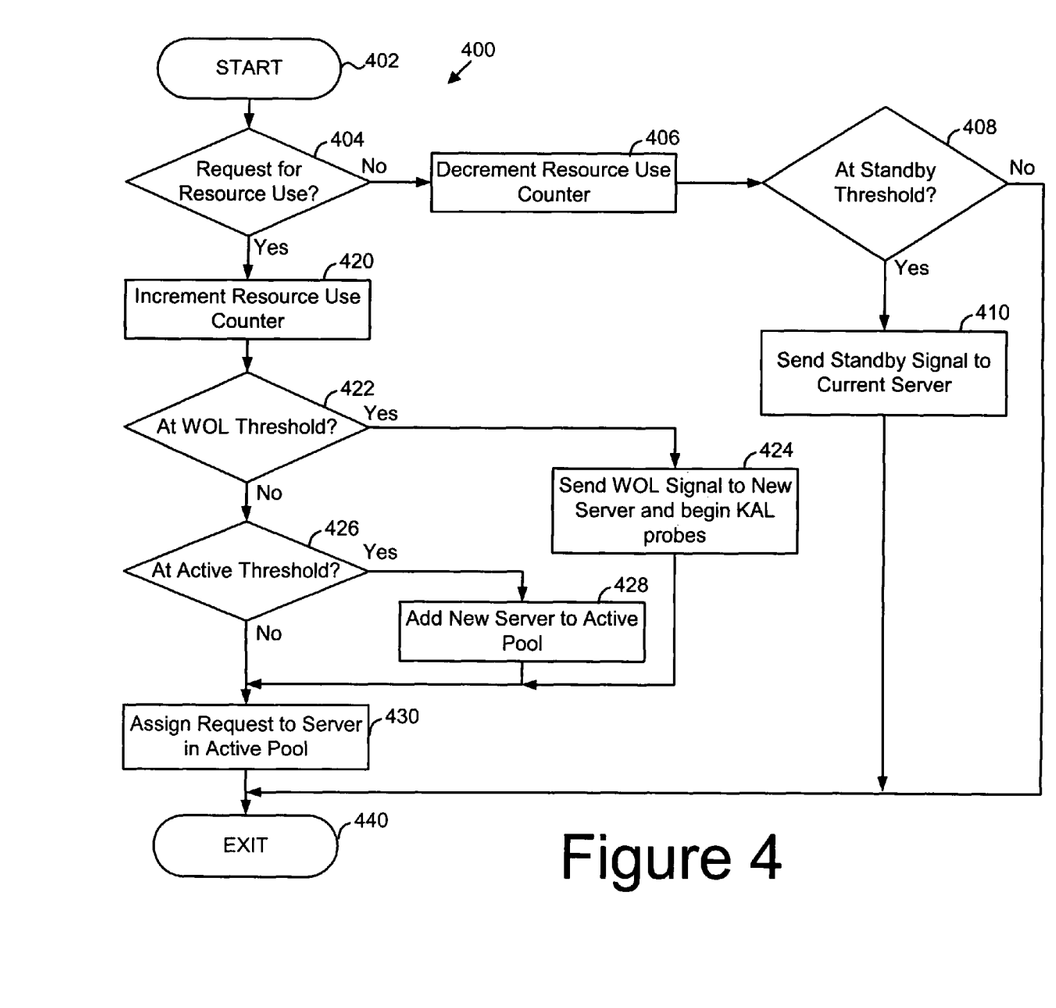
FIG. 4 shows a flowchart of basic steps in a procedure to handle an increase or decrease of a resource use.

FIG. 4 shows a flowchart 400 of basic steps in a procedure to handle an increase or decrease of a resource use.

In FIG. 4, flowchart 400 is entered at step 402 when an increase or decrease in a resource use is performed. An increase in a resource use can be, for example, a new connection request, and a decrease in a resource use can be completion of servicing a connection request as by providing a web page in response to a connection request.

At step 404 a check is made as to whether the routine has been entered because of a request for resource use. If not, it is assumed that the routine has been called because of a completion of a resource use and step 406 is executed to decrement a count of the resource use. Note that other approaches to resource measurement and tracking need not use a counter. If resource use is a more complex measurement a floating point variable can be used, multiple variables or an array or other data structure might be used, etc.

After decrementing the resource use counter at 406 a check is made at 408 to determine whether the standby threshold for a new (i.e., next active) server has been attained. If not, the routine exits at step 440. Otherwise step 410 is executed to send a standby signal to the current server to place it into a standby mode and the routine terminates at step 440.

Returning to step 404, if it is determined that the routine has been entered to process a request for resource use then step 420 is executed to increment the resource use rate counter. Next, step 422 is performed to check whether the new value of the counter achieves the WOL threshold for a new server. If so, execution proceeds to step 424 where the WOL signal is sent to the new server and periodic KAL signals are initiated. Then step 430 is executed to assign the request for resource use to the current server and the routine exits at step 440.

Returning to step 422, if the WOL threshold is not achieved then a check is made at 426 to determine if the active threshold is achieved (this routine assumes that the WOL and active threshold will not be the same). If so, step 428 is executed to add the new server to the active server pool and step 430 is executed to assign the request for resource use to the current (formerly new) server. If the check at 426 determines that the resource use counter is not at the active threshold then the current server pool remains unchanged. The current request is assigned to a server from the existing pool of resources, at step 430. The routine exits at step 440.

Although embodiments of the invention have been discussed primarily with respect to specific arrangements, formats, protocols, etc. any other suitable design or approach can be used. For example, although server farms have been primarily discussed, aspects of the invention can be applicable to any group of devices that use centralized load balancing. Although the number of connections has been described in detail as a basis for controlling server power management, any other performance criteria or resource use measurement can be used including processor load; storage, port or bus utilization; available channels in a wireless network interface, etc.

The embodiments described herein are merely illustrative, and not restrictive, of the invention. For example, the network may include components such as routers, switches, servers and other components that are common in such networks. Further, these components may comprise software algorithms that implement connectivity functions between the network device and other devices.

Any suitable programming language can be used to implement the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for controlling power consumption of a server, the method comprising:
   setting a limit of resource use for a first active server;
   measuring the resource use of the first active server;
   receiving a request for additional resource use;
   when the measured resource use of the first active server plus the request for additional resource are in a predetermined relationship with a pre-active threshold of a first connection rate, then
   initiating powering up of a inactive server into an active state in response to the measured resource use of the first active server achieving the pre-active threshold, the first connection rate of the pre-active threshold being less than a second connection rate of an active threshold , wherein said initiating powering up of the inactive server includes:
   sending a power up signal to the inactive server to initiate powering up of the inactive server before the second connection rate of the active threshold is reached; and
   upon reaching the pre-active threshold, initiating periodic keep alives to the inactive server to keep the inactive server powered up after the pre-active threshold is met and before the inactive server is activated to be assigned requests for additional resource use, wherein the periodic keep alives do not place the inactive server into an active state;

placing the inactive server into the active state as a second active server when the active threshold is met; and assigning requests for additional resource use to the second active server.

2. The method of claim 1, wherein a resource use includes a network connection request.

3. The method of claim 2, wherein the network connection request includes a request for web page content.

4. The method of claim 2, wherein the network connection request includes a request for data from a database.

5. The method of claim 1, wherein the resource use includes a connection rate, wherein measuring the resource use includes measuring a current connection rate, the method further comprising:

determining connection rate of the pre-active threshold for the first server; and detecting when incoming requests for additional connections would exceed the pre-active threshold.

6. The method of claim 1, further comprising:

setting an inactive threshold that is of a third connection rate lower than the pre-active threshold, wherein the second active server is transitioned to standby upon reaching the inactive threshold;

measuring a resource use of the second active server; and placing the second active server into the standby state when the measured resource use of the second active server achieves a predetermined relationship to the inactive threshold.

7. The method of claim 6, the method further comprising:

measuring a rate of current connections of the second active server; and placing the second active server into an inactive state when the rate of current connections of the second active server achieves the inactive threshold.

8. The method of claim 6, wherein the keep-alives are sent after the active threshold is met, wherein when the standby threshold is met, the keep-alives are not sent.

9. The method of claim 1, wherein the first and second active servers each include a cluster of servers.

10. The method of claim 1, wherein each server has associated devices, the method further comprising:

placing devices associated with a particular computer into an active state when the particular server is placed into an active state, and placing the devices into an inactive state when the particular server is placed into an inactive state.

11. The method of claim 1, wherein a system includes multiple levels, wherein multiple servers are included in each level, the method further comprising:

assigning different weights to two or more of the levels; and using the different weights to determine the predetermined relationship with the set limit, wherein a decision to place any servers in a particular level into an active state includes use of a weight associated with the particular level.

12. The method of claim 1 additionally comprising measuring a time for the second inactive server to transition into the active state.

13. The method of claim 12 additionally comprising moving the pre-active threshold or a standby threshold based on the time for transition of the second inactive server into the active state.

14. The method of claim 1 additionally comprising:

measuring a frequency of server-standby timeouts for the second active server; and moving the pre-active threshold or a standby threshold based on frequency of server-standby timeouts.

15. A method for managing power among servers in a server farm, the method comprising:

predetermining a threshold limit on the number of connections for a first server in the server farm;

monitoring the first server to determine when a number of connections being handled by the first server is near the threshold limit;

powering up a second server from a low-power state to a active state when the first server's number of connections is near the threshold limit, wherein a particular server in the low-power state consumes energy at a lower rate than the particular server in the active state;

initiating periodic keep alives to the second server being powered up to keep the second server powered up before the second server is activated to be assigned connections, wherein the periodic keep alives do not place the inactive server into an active state;

activating the second server upon reaching the threshold limit;

assigning connections to the second server;

monitoring the second server to determine when its number of connections falls below a lower limit; and in response to the second server's connections falling below the lower limit, placing the second server into the low-power state.

16. The method of claim 15 additionally comprising:

measuring the time for the second server to transition from the active state into the low-power state; and moving when the second server is powered up the threshold limit or a standby threshold based on the time for transition of the second inactive server into the active state.

17. An apparatus for controlling power to servers, the apparatus comprising:

a computer processor coupled to a plurality of servers;

a machine-readable storage medium coupled to the computer processor, wherein the machine-readable storage medium includes one or more instructions executable by the computer processor for:

setting a limit of resource use for a first active server;

measuring the resource use of the first active server;

receiving a request for additional resource use;

when the measured resource use of the first active server plus the request for additional resource are in a predetermined relationship with a pre-active threshold of a first connection rate, then initiating powering up of a inactive server into an active state in response to the measured resource use of the first active server achieving the pre-active threshold, the first connection rate of the pre-active threshold being less than a second connection rate of an active threshold, wherein said initiating powering up of the inactive server includes:

sending a power up signal to the inactive server to initiate powering up of the inactive server before the second connection rate of the active threshold is reached; and upon reaching the pre-active threshold, initiating periodic keep alives to the inactive server to keep the inactive server powered up after the pre-active threshold is met and before the inactive server is activated to be assigned requests for additional resource use, wherein the periodic keep alives do not place the inactive server into an active state;

placing the inactive server into an active state as a second active server when the active threshold is met; and assigning requests for additional resource use to the second active server.

18. A machine-readable storage medium including instructions executable by a computer processor, the machine-readable storage medium comprising:

one or more instructions for setting a limit of resource use for a first active server;

one or more instructions for measuring the resource use of the first active server;

one or more instructions for receiving a request for additional resource use;

one or more instructions for when the measured resource use of the first active server plus the request for additional resource are in a predetermined relationship with a pre-active threshold of a first connection rate, then one or more instructions for initiating powering up of a inactive server into an active state in response to the measured resource use of the first active server achieving the pre-active threshold, the first connection rate of the pre-active threshold being less than an active threshold of a second connection rate, wherein said one or more instructions for initiating powering up of the inactive server includes:

one or more instructions for sending a power up signal to the inactive server to initiate powering up of the inactive server before the second connection rate of active threshold is reached; and upon reaching the pre-active threshold, one or more instructions for initiating periodic keep alives to the inactive server being powered up to keep the inactive server powered up after the pre-active threshold is met and before the inactive server is activated to be assigned requests for additional resource use, wherein the periodic keep alives do not place the inactive server into an active state; and one or more instructions for placing the inactive server into an active state as a second active server when the active threshold is met; and one or more instructions for assigning requests for additional resource use to the second active server.

19. A method for controlling power consumption of servers in a group of servers, the method comprising:

assigning servers to an active pool or an inactive pool;

setting a limit of resource use for the active pool;

measuring the resource use of the active pool;

receiving a request for additional resource use;

when the measured resource use of the active pool plus the request for additional resource are in a predetermined relationship with a pre-active threshold of a first connection rate, then initiating powering up of at least one server into an active pool in response to the measured resource use of the active pool achieving the pre-active threshold, the first connection rate of the pre-active threshold being less than a second connection rate of an active threshold;

subsequent to the step of initiating powering up of and before placing at least one server from the inactive pool into the active pool, initiating periodic keep alives to the at least one server to keep the at least one server powered up after activating the at least one server and before the at least one server is placed in the active pool to be assigned connections, wherein the periodic keep alives do not place the inactive server into an active state;

placing the at least one server from the inactive pool into the active pool upon reaching the active threshold; and upon reaching the active threshold, assigning requests for additional resource use to the active pool, the active pool including the at least one server.

20. The method of claim 19, wherein measuring the resource use includes measuring a current connection rate, the method further comprising:

determining a threshold connection rate for the active pool; and detecting when incoming requests for additional connections would exceed the pre-active threshold.

21. The method of claim 19, wherein said resource use includes a network connection request which includes a request for web page content or a request for data from a database.

* * * * *